United States Patent [19]

Morioka et al.

[11] Patent Number: 4,916,548
[45] Date of Patent: Apr. 10, 1990

[54] VIDEO TAPE RECORDER FOR RECORDING/REPRODUCING TWO-CHANNEL COMPONENT COLOR VIDEO SIGNALS

[75] Inventors: Yoshihiro Morioka, Neyagawa; Masaaki Kobayashi, Kawanishi, both of Japan

[73] Assignee: Matsushita Electric Industrial Co., Ltd., Osaka, Japan

[21] Appl. No.: 21,481

[22] Filed: Mar. 4, 1987

[30] Foreign Application Priority Data

Mar. 7, 1986 [JP]  Japan ................................. 61-51175

[51] Int. Cl.$^4$ ............................................. H04N 5/782
[52] U.S. Cl. .................................... 358/335; 358/320; 358/328; 358/330; 360/9.1; 360/23
[58] Field of Search ............... 358/310, 320, 321, 330, 358/14, 335, 337, 327, 328, 340; 360/9.1, 23

[56] References Cited

U.S. PATENT DOCUMENTS

| | | | |
|---|---|---|---|
| 3,781,463 | 12/1973 | Van den Bussche | 358/320 X |
| 4,233,621 | 11/1980 | Yamagiwa et al. | 358/328 |
| 4,245,235 | 1/1981 | Poetsch | 358/14 |
| 4,335,393 | 6/1982 | Pearson | 358/310 |
| 4,467,368 | 8/1984 | Horstmann | 358/310 |
| 4,542,417 | 9/1985 | Ohta | 358/337 X |
| 4,608,609 | 8/1986 | Takano et al. | 358/310 X |
| 4,613,908 | 9/1986 | Takahashi et al. | 358/310 |
| 4,618,894 | 10/1986 | Ichinoi | 358/310 |
| 4,626,929 | 12/1986 | Ichinoi et al. | 358/310 |
| 4,641,201 | 2/1987 | Ichinoi et al. | 358/330 X |
| 4,677,498 | 6/1987 | Tsushima | 358/310 |
| 4,730,222 | 3/1988 | Schauffele | 360/9.1 X |
| 4,739,419 | 4/1988 | Schauffele | 360/23 X |

FOREIGN PATENT DOCUMENTS

| | | |
|---|---|---|
| 58-131885 | 8/1983 | Japan . |
| 59-4279 | 1/1984 | Japan . |
| 59-34785 | 2/1984 | Japan . |
| 59-104886 | 6/1984 | Japan . |
| 59-104887 | 6/1984 | Japan . |

OTHER PUBLICATIONS

"A ½ Inch Metal-Cassette VTR System", by S. Matsuda et al., Technical Report of the Institute of Television Engineers of Japan, vol. 9, No. 2 (May 1985), pp. 19–24.

Primary Examiner—Alan Faber
Assistant Examiner—W. R. Young
Attorney, Agent, or Firm—Wenderoth, Lind & Ponack

[57] ABSTRACT

A video tape recorder has a pair of rotary magnetic heads spaced apart by 180° from each other on a rotary cylinder which rotates one turn (360°) during each field of a video signal to be recorded. A recording circuit has first and second memories for respectively storing first and second channel component signals of the video signal contained in at least one field for time-compressing them. The first and second memories are controlled to output the time-compressed first and second channel component signals alternately. A reproducing circuit has third and fourth memories for respectively time-expanding the time-compressed first and second channel component signals contained in a reproduced signal to obtain the original two-channel component signals.

2 Claims, 15 Drawing Sheets

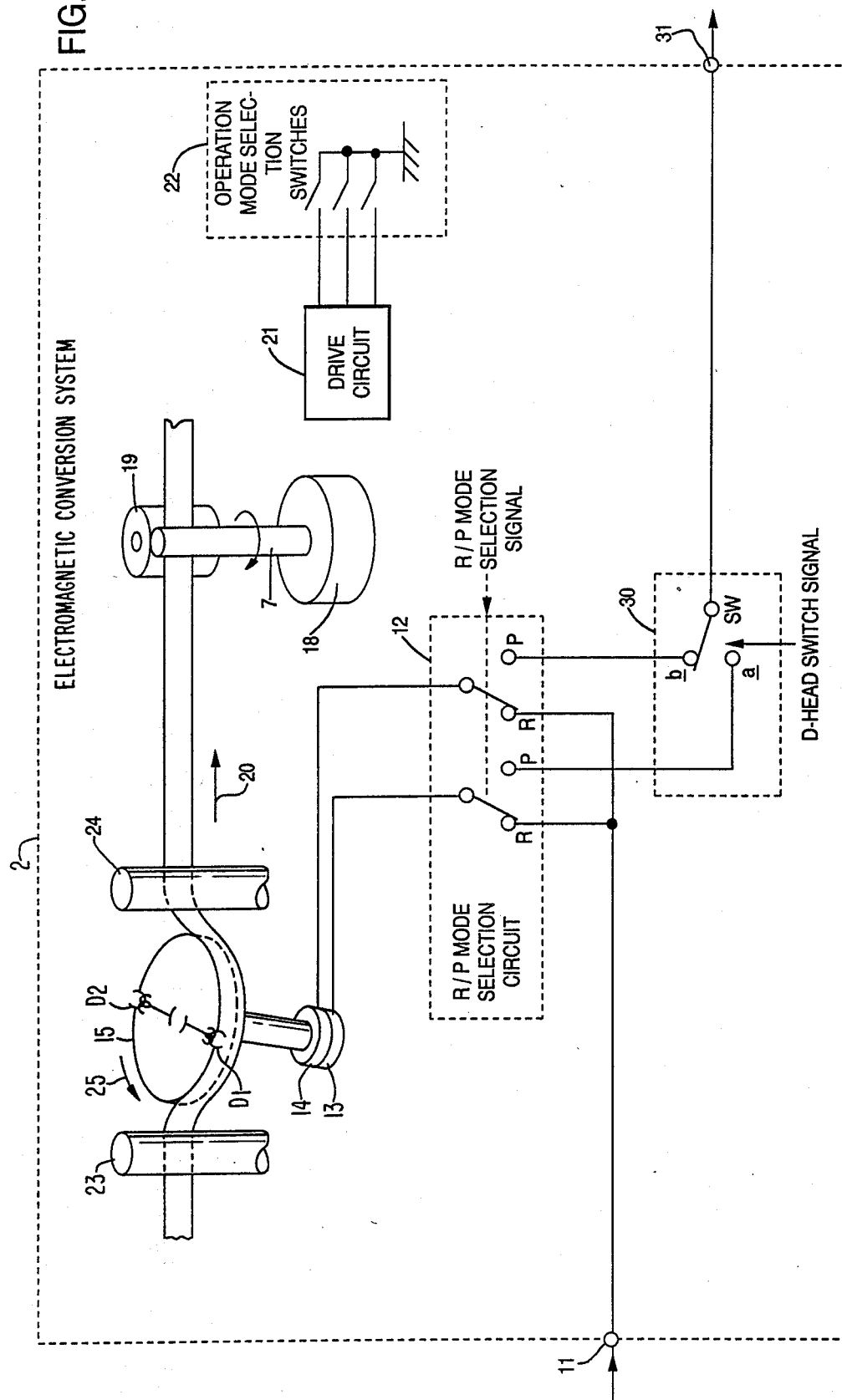

4,916,548

VIDEO TAPE RECORDER FOR RECORDING/REPRODUCING TWO-CHANNEL COMPONENT COLOR VIDEO SIGNALS

BACKGROUND OF THE INVENTION

1. Field of the Invention

This invention relates to a video tape recorder (VTR), and more particularly to a two-channel VTR which records a video signal separated into two channel components on a magnetic tape and then reproduces the recorded signal.

2. Description of the Prior Art

Conventional 2 channel VTRs widely used for broadcasting and record video signals on a magnetic tape via two pairs of rotary heads in such a manner that a frequency modulated (FM) luminance signal Y and an FM chrominance signnal C are recorded on separate tracks which are arranged alternately in the order of Y, C, Y, C, Y, C,—. The FM Chrominance signal is a signal which is obtained by time-base-compression-multiplexing two chrominance difference signals and frequency-modulating the multiplexed signal, or a signal which is obtained by frequency modulating two chrominance difference signals with different carrier frequencies and mixing the frequency-modulated signals (so-called frequency-division-multiplexed signal), or a signal which is obtained by frequency-modulating so-called line sequential chrominance difference signals which appear alternately at a cycle of one horizontal scanning period. These are shown in Japanese Laid-Open Patent Application (Kokai) Nos. 59-4279, 59-34785, 58-131885, 59-104886 and 59-104887. Each pair of heads are disposed so as to be 180° apart from each other on a circumference of a rotary cylinder. Each head of one pair is disposed adjacent to one head of the other pair. A typical conventional 2 channel VTR is shown in "A ½ inch Metal-Cassette VTR System" by S. Matsuda et al., Technical Report of the Institute of Television Engineers of Japan, Vol. 9, No. 2 (May 1985), pp. 19–24.

Although the conventional 2 channel VTRs can provide high quality video signals, they have the following disadvantages.

The conventional 2 channel VTRs operate in only one fixed operation mode, i.e., standard mode, but cannot operate in special operation modes such as a long play mode. If they were required to operate in an additional operation mode, two additional pairs of heads would have to be provided on the rotary cylinder, which would be very difficult or almost impossible.

Furthermore, the conventional 2 channel VTRs, when recording, provide a guard band between two adjacent signal tracks on the magnetic tape for eliminating crosstalk between the signals recorded on the adjacent signal tracks. This is disadvantageous with respect to increasing recording density.

Furthermore, since two heads are disposed adjacent to each other, production and adjustment of the head system is very difficult, and a shield plate must be provided between two adjacent heads for eliminating crosstalk between the two adjacent heads. As the result, the head system of the conventional 2 channel VTRs is too expensive for home use. This is the main reason for that the 2 channel VTRs have been used only for broadcasting.

SUMMARY OF THE INVENTION

An object of the present invention is to provide a two-channel video tape recorder capable of recording and reproducing video signals in not only a standard mode but also in a long play mode.

Another object of the present invention is to provide a two-channel video tape recorder capable of recording video signals on a magnetic tape with no guard band thereby so as to realize a high density recording of video signals.

Still another object of the present invention is to provide a two-channel video tape recorder capable of recording and reproducing two-channel video signals by only two heads.

A further object of the present invention is to provide an inexpensive two-channel video tape recorder for home use.

To achieve these objects, a video tape recorder according to the present invention comprises: a recording signal processing means for processing two-channel component signals to be a time-compressed into a one channel recordable signal by using memories; an electromagnetic conversion means including one pair of rotary magnetic heads for recording the time-compressed one channel recordable signal on a magnetic tape and for reproducing the recorded signals, each head being disposed so as to be apart by 180 degrees from each other on a circumference of a rotary cylinder which rotates one revolution during a field; a reproduced signal processing means for processing the time-compressed one channel reproduced signal to obtain the original two-channel component signals by using memories; and a memory control means for controlling the read/write address and timing of said memories.

More specifically, the recording signal processing means has first and second memories for time-compressing first and second channel component signals, respectively. The memory control means controls the first and second memories so as to output the time-compressed first and second channel component signals alternately to obtain a one channel compressed signal which contains the time-compressed two channel component signals which occur alternately. The one channel compressed signal is frequency-modulated by a frequency modulator so as to be the one channel recordable signal.

The reproduced signal processing means has a frequency demodulator for frequency-demodulating the reproduced signal from the electromagnetic conversion means to obtain the one channel compressed signal, and third and fourth memories for time-expanding the time-compressed first and second channel component signals, respectively, contained in the one channel compressed signal so as to obtain the original two-channel component signals.

Preferably, the relative heights of the two heads in an axial direction of the rotary cylinder are the same so that the relative position of each signal track with respect to the other signal track on the magnetic tape will not change but are similar at any tape speed, i.e., in any operating mode of the video tape recorder.

The above and other objects, features and advantages of the invention will be apparent from the following description of the preferred embodiments taken in connection with the accompanying drawings in which:

BRIEF DESCRIPTION OF THE DRAWINGS

FIG. 4 is a schematic block diagram of an electromagnetic conversion system used in the embodiment of the present invention;

DESCRIPTION OF THE PREFERRED EMBODIMENTS

Figure 1:
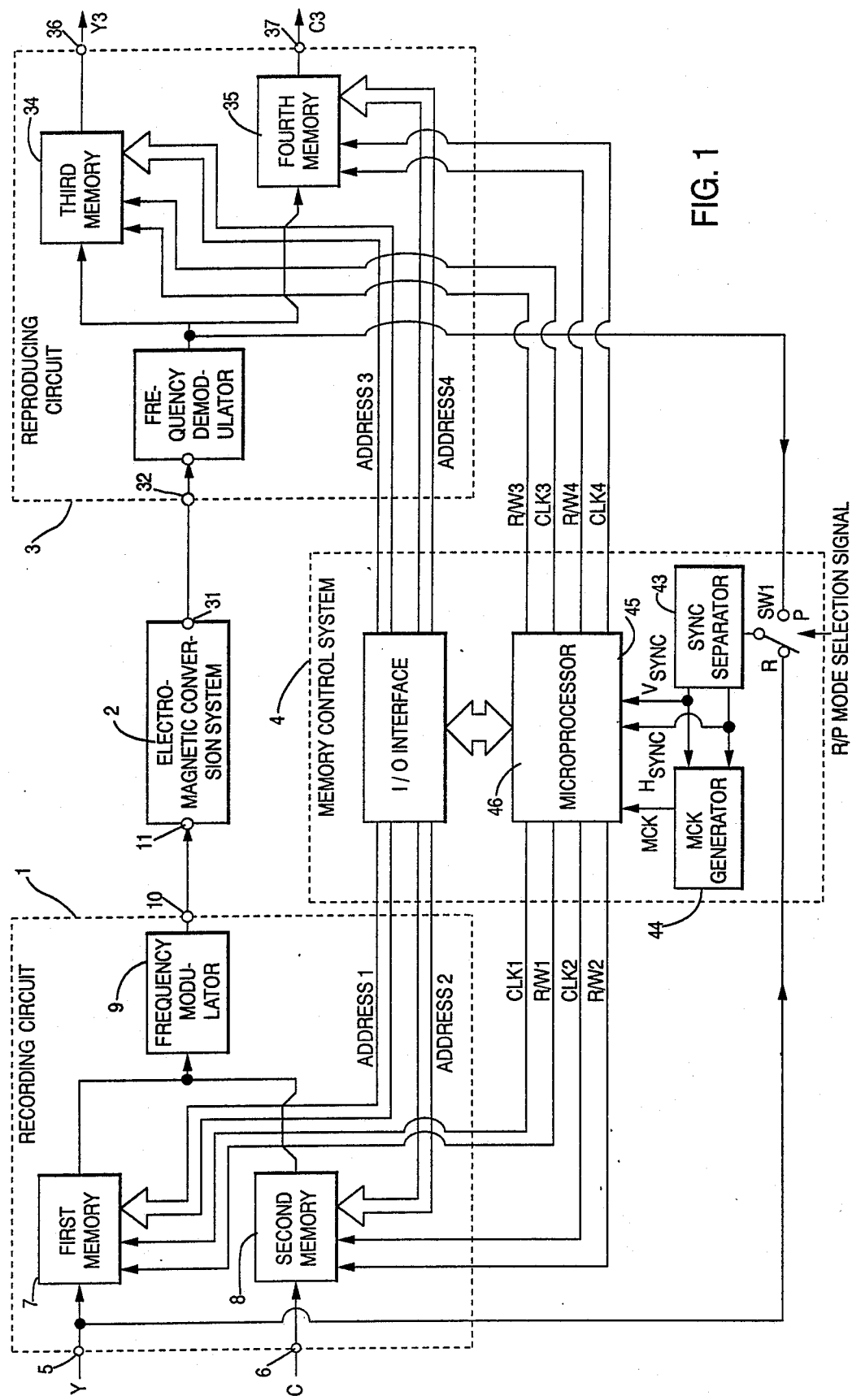
FIG. 1 is a schematic block diagram showing an embodiment of the present invention.

FIG. 1 shows a schematic block diagram of a two-channel video tape recorder according to the present invention. The video tape recorder in FIG. 1 is composed of a recording circuit 1, an electromagnetic conversion system 2, a reproducing circuit 3, and a memory control circuit 4. Here, we consider a video tape recorder which treats an NTSC video signal.

A luminance signal signal Y is applied to an input terminal 5 and a chrominance signal C is applied to an input terminal 6. Here, the chrominance signal C is a signal obtained by time-base-compression-multiplexing of two chrominance difference signals, and the chrominance signal C has its own horizontal synchronizing signal.

The input luminance signal Y is inputted to a first memory 7 and the input chrominance signal C is inputted to a second memory 8. Each of the memories 7 and 8 may have a random access memory (RAM) which can store at least one field (V) of signal.

Figure 2:
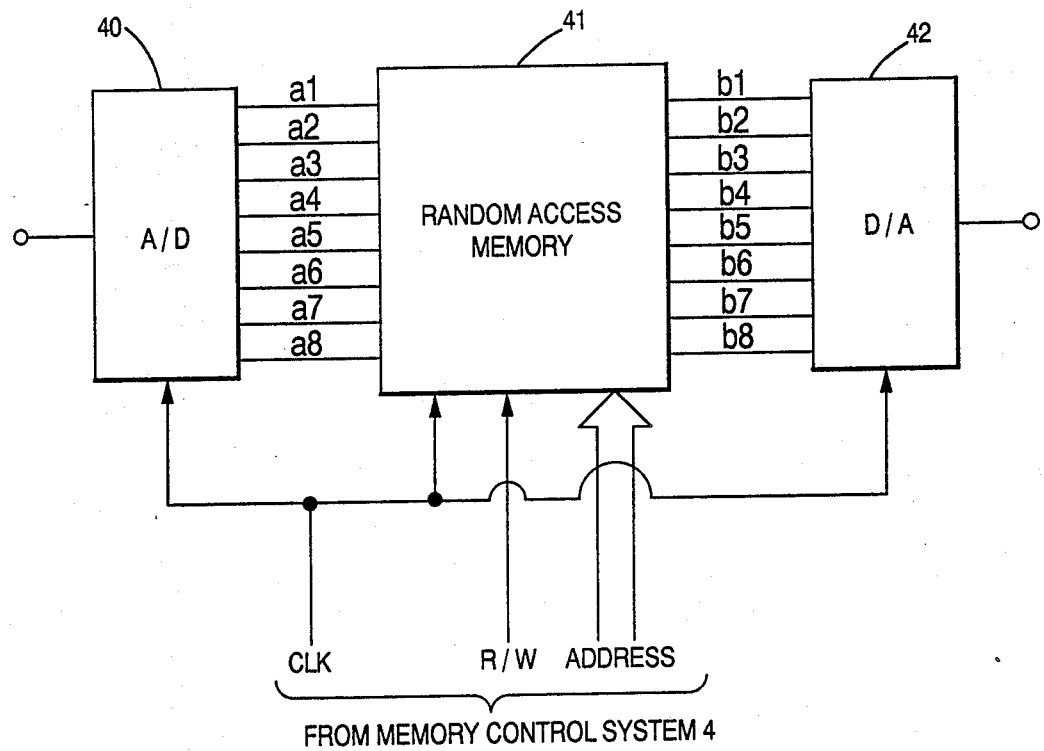
FIG. 2 is a schematic block diagram of each memory used in the embodiment of the present invention.

FIG. 2 shows an example of memory comprising an A/D converter 40, a RAM 41 and a D/A converter 42. Referring to FIG. 2, an input signal is converted to a 8-bit digital signal (a1, a2, ..., a8) by the A/D converter 40 with a clock (CLK) supplied from the memory control system 4.

When a read/write (R/W) mode signal indicates a write mode, the 8-bit digital signal is written in RAM 41 at an address specified by an address signal from the memory control system 4. When the R/W mode signal is turned to a read mode, the stored data (b1, b2, ..., b8) are output from RAM 41 and converted to an analog signal by the D/A converter 42 with a clock (CLK) from the memory control system 4. The clock frequency is controlled and changed by the memory control system 4.

Referring to FIG. 1, the clocks for the memories 7 and 8 are supplied from a microprocessor ($\mu$P) 45. In a recording mode, a changeover switch SW1 selects its R terminal in response to an externally given R/P mode selection signal. So, a synchronizing signal separator (SYNC SEPARATOR) 43 separates the horizontal synchronizing signal (Hsync) and field synchronizing signal (Vsync) from the input luminance signal Y. Then, a recording system master clock (MCK) is produced from Hsync and Vsync by a phase-lock-loop (not shown) in a master clock generator (MCK GENERATOR) 44. Clock CLK1 and CLK2 used for the first and second memories are generated by dividing the recording system master clock MCK in the $\mu$P 45. Such a clock generation process is known in the art.

Figure 3:
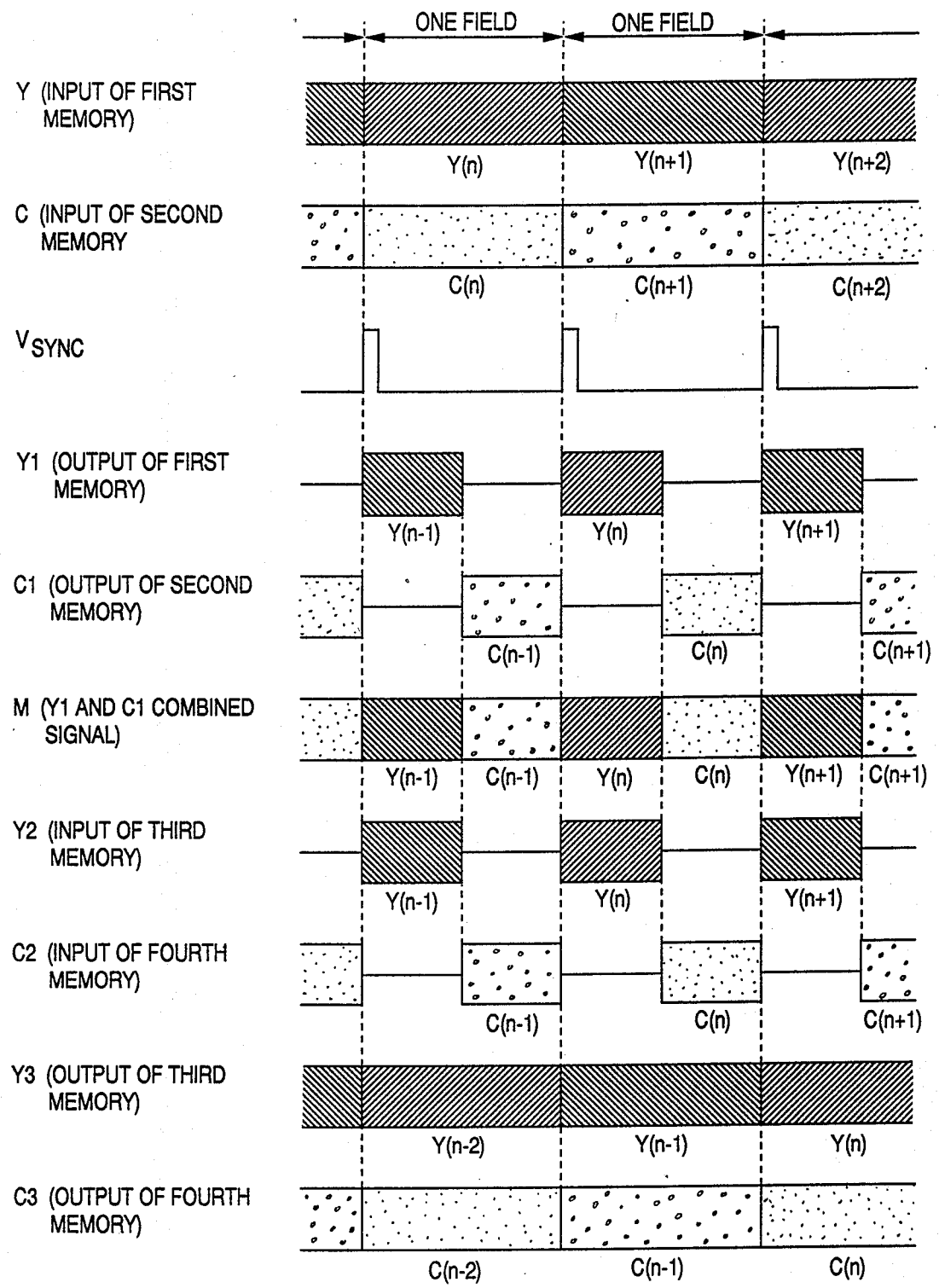
FIG. 3 is a signnal timing chart showing signal transformation processing of memories according to the present invention.

In a recording mode, each Y and C signal is time-compressed by one half in this system as follows. Referring to FIG. 3, which shows input-output timings of the first memory 7 and the second memory 8. The half time-compressed output signal Y1 of the first memory 7 and the half time-compressed output signal C1 of the second memory 8 are mixed to form a combined signal M. Here, for example, the frequency of the write clock for the memories 7 and 8 is $910 \times f_H$ ($f_H = 15.734$ kHz: horizontal synchronizing frequency in the NTSC system) and the frequency of the read clock is $1820 \times f_H$. So, each of the output signal of the first and second memories 7 and 8 is time-compressed by one half.

The access address selections of the first and second memories are controlled by the $\mu$P 45 in FIG. 1. The $\mu$P 45 receives Hsync, Vsync and MCK from the SYNC SEPARATOR 43 and MCK GENERATOR 44 respectively, and generates addressing signals ADDRESS1 and ADDRESS2 and read/write command signals R/W1 and R/W2 for the first and second memories. Then, the addressing signals and read/write command signals are sent to the first and second memories via I/O interface 46.

The addressing signals and read/write command signals control the first and second memories 7 and 8 so that the time-compressed luminance (Y1) and chrominance (C1) signals are outputted from the first and second memories alternately at periods of V/2 (V: one field period) so as to thereby obtain the combined signal M as shown in FIG. 3.

Again referring to FIG. 1, the combined signal M is frequency-modulated by a frequency modulator 9, outputted from an output terminal 10 of the recording circuit 1 to be applied to an input terminal 11 of the electromagnetic conversion system 2.

The electromagnetic conversion system 2 is shown in FIG. 4. In a recording mode, changeover switches of a R/P mode selection circuit 12 select its R terminals in response to an externally given R/P mode selection signal. So, the frequency-modulated (FM) combined signal M passes through the R/P mode selection circuit 12, and is applied to a pair of magnetic heads D1 and D2 via rotary transformers 13 and 14 which are mounted on a rotary shaft of a rotary cylinder 15.

A magnetic tape 16 is driven by a capstan 17 rotated by a capstan motor 18 and a pinch roller 19 to move in direction 20. The rotating speed of the capstan motor 18 is controlled by a drive circuit 21 according to an operation mode selection signal from operation mode selection switches 22 to change the moving speed of the magnetic tape 16. The magnetic tape 16 is guided by guide posts 23 and 24 to be wound on the rotary cylinder 15 by a angle of 180 degrees.

Figure 5A:
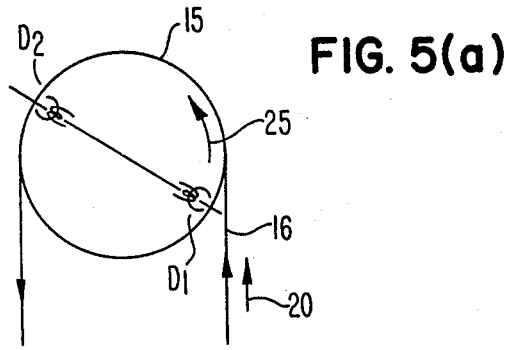
FIG. 5(a) and 5(b) are top view and horizontally expanded view, respectively, of two rotary magnetic heads, for showing a head arrangement according to the present invention.

Referring to FIG. 5(a) which shows a top view of the arrangement of the magnetic heads on a rotary cylinder 15, the heads D1 and D2 are spaced apart by 180 degrees from each other.

Figure 5B:
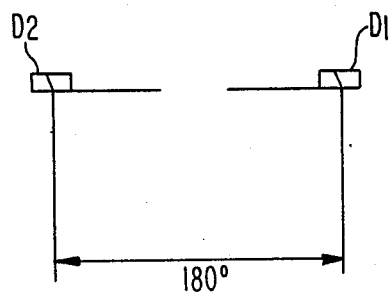

Referring to FIG. 5(b) which shows the arrangement of the magnetic heads in a rotational direction 25 thereof, the two heads D1 and D2 are at a same height, or rotate on a same plane. The head D1 has an azimuth ($\alpha$), and the head D2 has another azimuth ($\beta$) which is different from, or preferably inverse to that ($\alpha$) of the head D1, i.e. $\beta = -\alpha$.

Slant azimuth recording is known to increase the recording density. The gaps of the recording heads for scanning adjacent tracks are tilted to each other so that a crosstalk component from an adjacent track is attenuated due to azimuth loss. The azimuth loss is greater when the signal frequency is higher, or when the signal track is wider, or when the azimuth angle difference is greater. Thus, the recording density can be increased by properly selecting the signal frequency, the signal track width and the azimuth angle difference.

Figure 6:
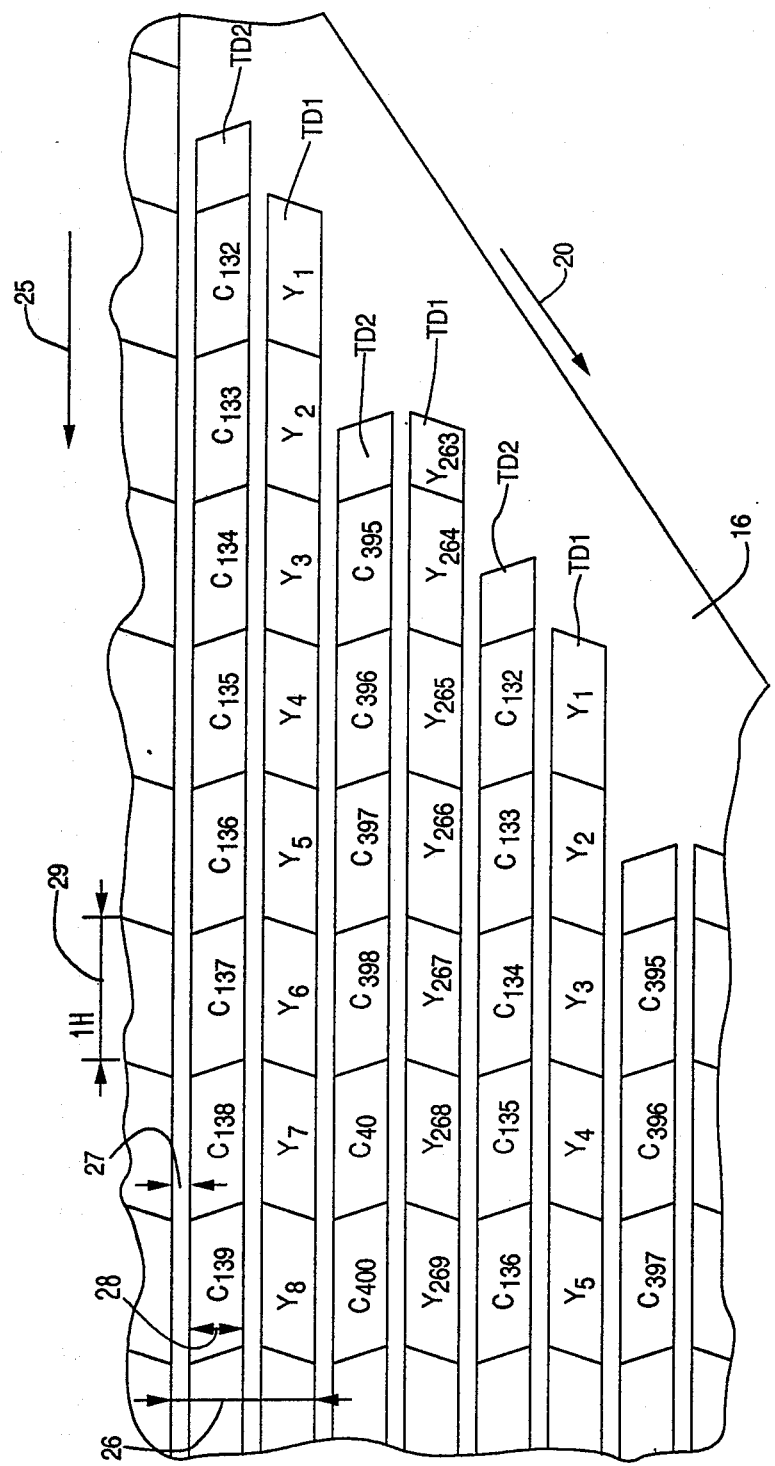
FIG. 6 is a track pattern diagram showing an example of signal track pattern in a standard mode according to the present invention.

The rotary cylinder 15 turns one turn (360 degrees) in the direction 25 in a time corresponding to one field of the video signal, during which time the magnetic tape 16 is moved a distance 26 in a direction 20 as shown in a track pattern diagram in FIG. 6.

In the following, we consider two turns of the rotary cylinder as a unit. The period of two turns of the rotary cylinder 15 corresponds to a two field span, i.e., a frame span. During the first and third half (180 degrees) turns of the rotary cylinder 15, the magnetic head D1 scans the magnetic tape 16 to record the FM luminance signal of each of the first and second fields in each frame. During the second and fourth half (180 degrees) turns of the rotary cylinder 15, the magnetic head D2 scans the magnetic tape 16 to record the FM chrominance signal of each of the first and second fields in each frame.

Referring to FIG. 6, signal tracks TD1 are recorded by the head D1, and signal tracks TD2 are recorded by the head D2. In FIG. 6, there exist guard bands 27, so the track width 28 is narrower than one half of the distance 26. In FIG. 6, symbols Y and C respectively indicate the luminance and chrominance signals, and each suffix indicates a horizontal line number. Numeral 29 indicates a distance corresponding to 1H (where H: one horizontal scanning period, $H = 1/f_H$).

Now, consider a case in which the track pattern when the magnetic tape travels at 1/n (n: any integer larger than one) of the tape speed in the standard operation mode (i.e., in the case of the long play mode) becomes similar to that in the standard operation mode. This long play mode is realized by changing the rotating speed of the capstan motor 18, when the operation mode select switches 22 which are connected to the drive circuit 21 are operated.

Figure 7:
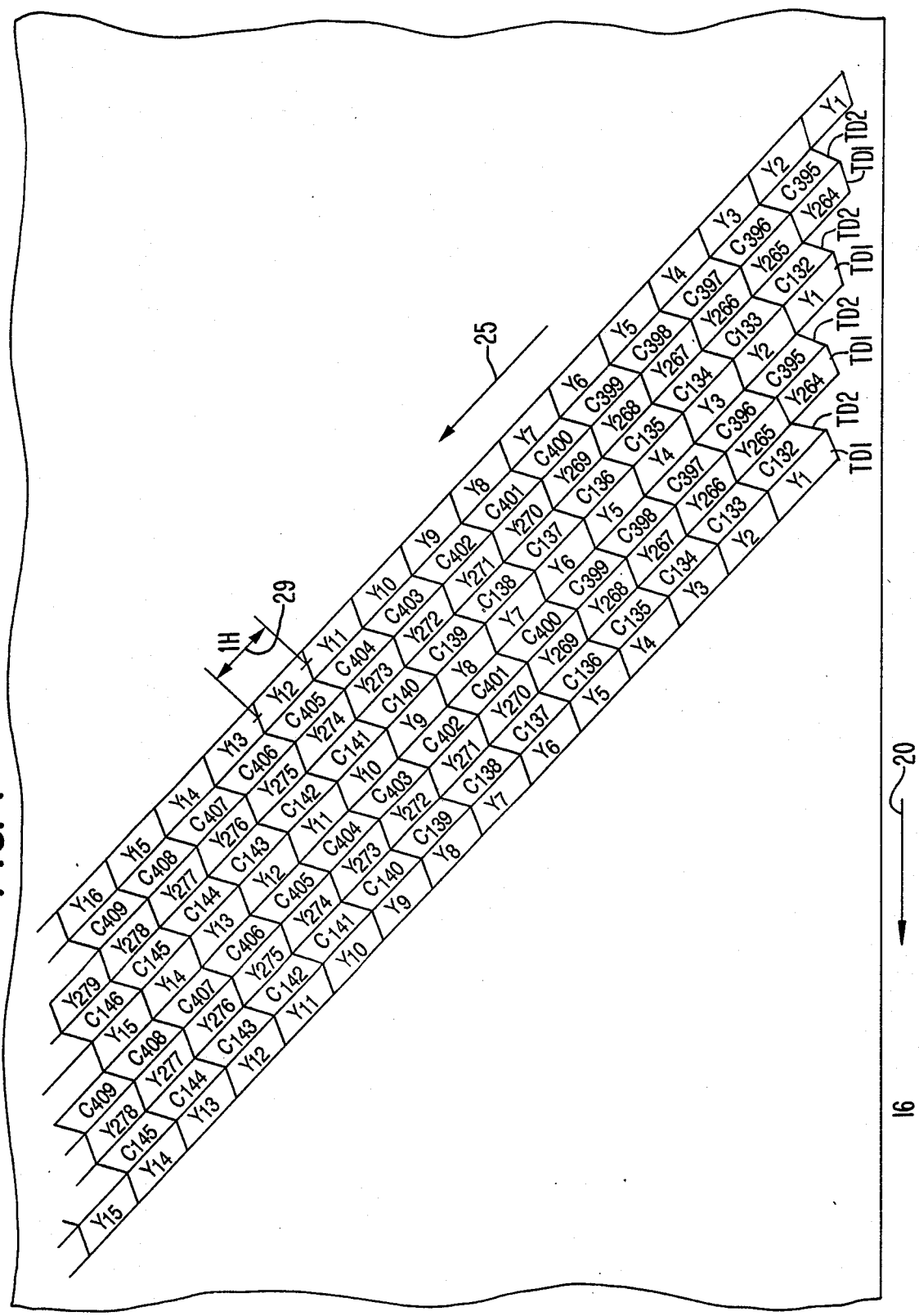
FIG. 7 is a track pattern diagram showing an example of signal track pattern in a long play mode according to the present invention.

This means that one track will not be overwritten perfectly on another adjacent track at any tape speed in any long play mode. FIG. 7 shows an example of signal track pattern in a long play mode, in which tracks TD1 and TD2 are recorded by the heads D1 and D2 respectively. Though one track is partly overwritten on another track, there will be no fear that a track would be erased or made narrower in a long play mode. Here, every track has the same track width and has a different azimuth from that of the adjacent track.

In the recording mode mentioned above the Y and C signal are one half times time-compressed, but the rotary cylinder 15 rotates one turn during a field of the input signal, so the record wavelength is equal to such a case in which the Y and C signal are not time-compressed and the rotary cylinder 15 rotates one half turn (180 degrees) during a field of the input signal.

Referring again to FIG. 4, in the playback mode, the recorded signals are reproduced by the same heads as those used for recording. The changeover switches of R/P mode selection circuit 12 selects P terminals in response to the R/P mode selection signal. So, the reproduced signals from the heads D1 and D2 pass through the R/P mode selection circuit 12 and are applied to a reproduced signal switching circuit 30. A changeover switch SW in the switching circuit 30 is responsible to an externally given D-head switch signal which indicates which one of the heads D1 and D2 is scanning the magnetic tape for operating in such a way as to select a terminal 'a' in a first half of each turn to produce the reproduced FM signal from the head D1 and a terminal 'b' in a second half of each turn to pass the reproduced FM signal from the head D2. The reproduced FM signal passed through the switch SW is directly outputted from an output terminal 31 of the electromagnetic conversion system 2.

Referring back to FIG. 1, the FM signal outputted from the electromagnetic conversion system 2 is inputted to an input terminal 32 of the reproducing circuit 3, and is frequency-demodulated by a frequency demodulator 33 so as to regenerate the original baseband time-compressed and combined signal M.

On each part between two adjacent one-field-signal recorded parts of each track, a horizontal synchronizing signal (Hsync) having a large crosstalk power is recorded. If the Hsync recorded part was adjacent to a signal recorded part in a direction perpendicular to the head moving direction 25, Hsync would cause a bad influence on the adjacent signal as a crosstalk signal. But, in the track pattern as shown in FIGS. 6 and 7 obtained according to the present invention, each Hsync is recorded so to be adjacent to another Hsync in the direction perpendicular to the head moving direction 25, so that the recorded FM luminance and chrominance signals will not be affected by the crosstalk of Hsync.

Again referring to FIG. 1, the demodulated signal M is applied to the SYNC SEPARATOR 43 via a changeover switch SW1 which selects its terminal P in a playback mode. The SYNC SEPARATOR 43 separates synchronizing signals included in the combined signal M. Here separated synchronizing signals are both the luminance and chrominance synchronizing signals. The playback system master clock MCK is generated by the phase-locked-loop inside the MCK GENERATOR 44.

Then, clocks CLK3 and CLK4 used for third and fourth memories 34 and 35, are generated by dividing the playback system MCK in the μP 45.

Here the third memory write clock and fourth memory write clock are both $1820 \times f_H$ and the third memory read clock and the fourth memory read clock are both $910 \times f_H$. So, the output signals of the third and fourth memories 34 and 35 are twice time-expanded. The address selections of the third and fourth memories are controlled by the μP 45 in FIG. 1. The μP 45 receives playback synchronizing signals from the PB clock generator via I/O interface 46 and generates addressing signals ADDRESS3 and ADDRESS4 and read/write command signals R/W3 and R/W4 for the third and fourth memories. Then, the addressing signals and read/write commands are sent to the third and fourth memories 34 and 35 via I/O interface 46. The signal transformation process (Y2, C2→Y3, C3) is inverse to the recording process as shown in FIG. 3. Then, the reproduced Y and C signals Y3 and C3 are outputted from the output terminals 36 and 37, respectively.

Figure 8:
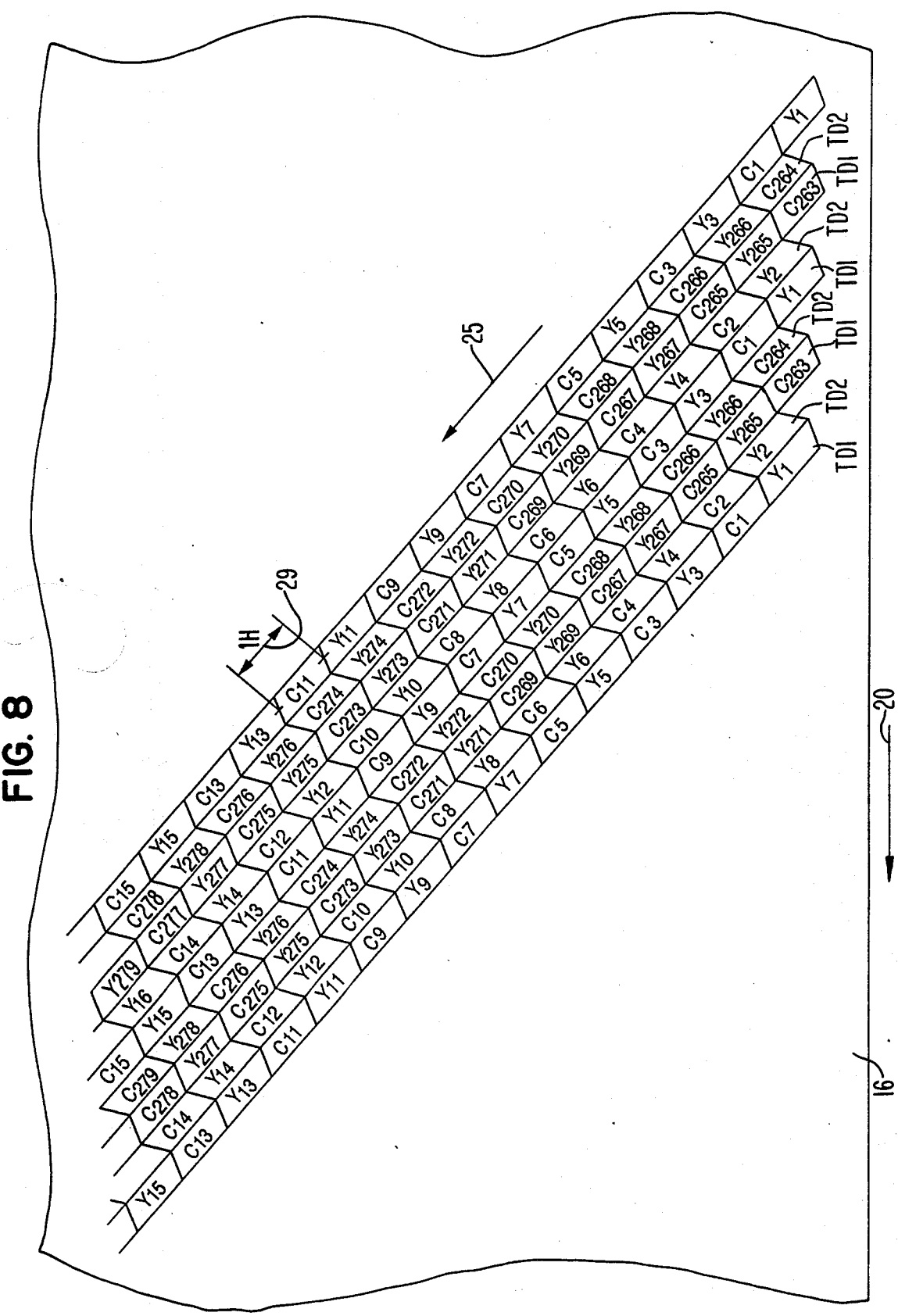
FIG. 8 is a track pattern diagram showing another example of signal track pattern in a standard mode according to the present invention.

FIG. 8 shows another track pattern example of the present invention. In this case, the recording circuit 1, the electromagnetic conversion system 2, the reproducing circuit 3 and the memory control system 4 have the same configuration as that of the embodiment shown in FIG. 1. The difference is essentially only the R/W address and timing control of memories. In this case another procedure of address generation is done by the μP 45. This can be easily realized by changing the program of the address generation pattern in μP 45.

Figure 9:
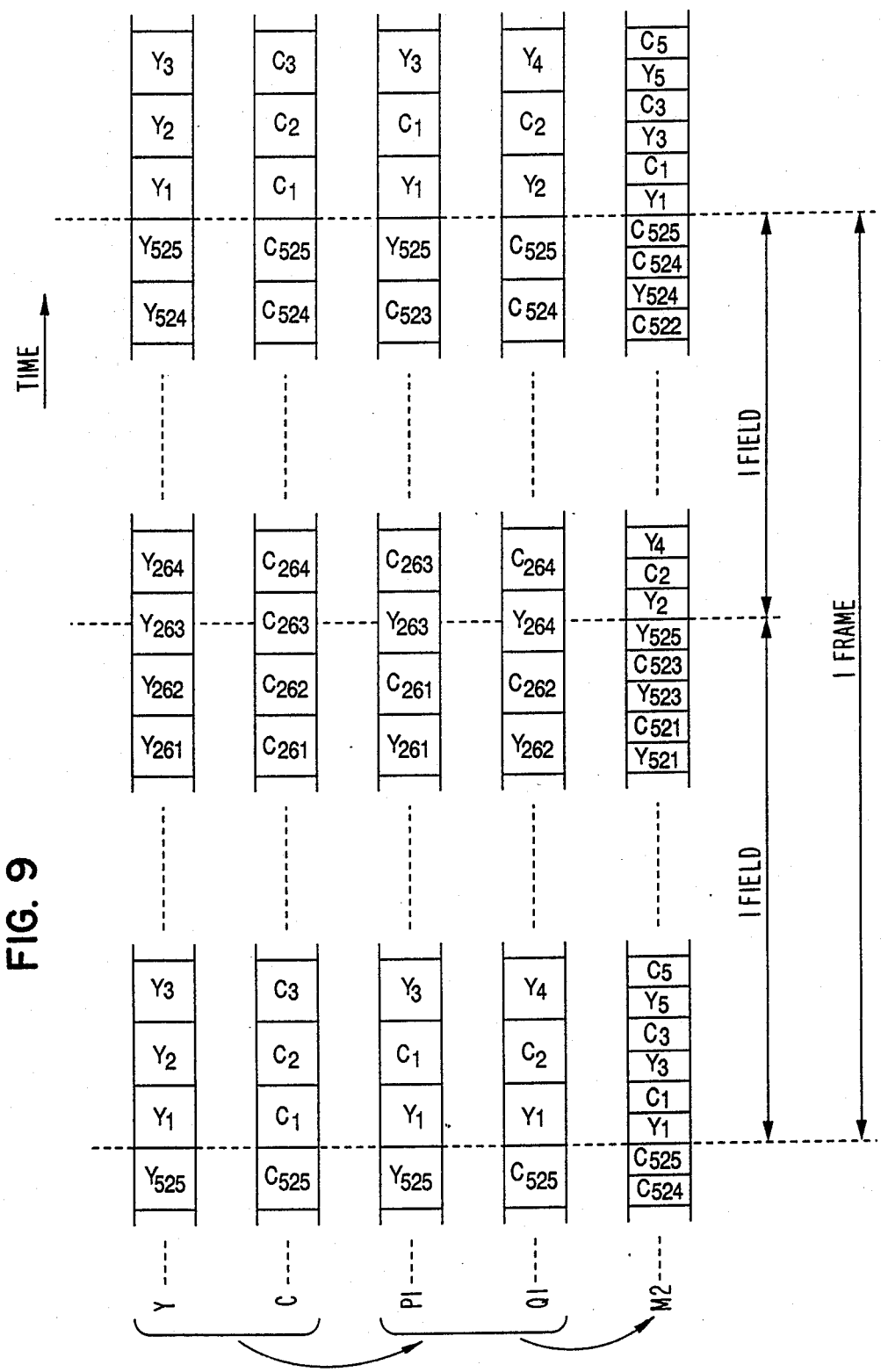
FIG. 9 is a signal timing chart showing signal transformation processing to obtain the track pattern of FIG. 8.

The FM combined signal M2 are recorded on the magnetic tape in the same way as described in connection with the embodiment of FIG. 1. The signal transformation in this case is shown in FIG. 9. The input luminance signal Y and chrominance signal C are changed over, are half times time-compressed and combined so as to be the combined signal M.

In FIG. 8 the tracks TD1 and TD2 are respectively recorded by the heads D1 and D2. The parts on which a same kind of signal (Y or C) is recorded are aligned in a direction perpendicular to the head moving direction 25. In other words, a luminance signal recorded part is adjacent to another luminance signal recorded part and a chrominance signal recorded part is adjacent to another chrominance recorded part in the head width direction. From the characteristics of the line scanning video signal, each signal in FIG. 8 has a strong correlation to an adjacent track signal.

According to the frequency modulation theory, the influence of crosstalk decreases in inverse proportion to the frequency difference from the carrier frequency. In the track pattern shown in FIG. 7, since the same kind of signal is recorded on the parts adjacent to each other in the head width direction, the influence of crosstalk is reduced to a minimum. Therefore, the signals recorded on each track will hardly be affected by the crosstalk from the signals recorded on an adjacent track.

Referring again to FIG. 1, in the playback mode, the recorded FM combined signals are reproduced and outputted from the output terminal 31 of the electromagnetic conversion system 2 in the same way as described in connection with the embodiment of FIG. 1. The reproduced FM combined signal M2 is applied to the input terminal 32 of the reproducing circuit system 3, and frequency-demodulated by the frequency demodulator 33.

The demodulated signal M2 is applied to the memory read/write timing control circuit 38, and the memory read/write control circuit 38 operates the read/write timings of third memory 34 and fourth memory 35 so as to select and input the time compressed Y1 signal to the third memory 34 and the time compressed C1 signal to the fourth memory 35 from the reproduced FM combined signal M2. Here, the third memory 34 and the fourth memory 35 are RAM which can store more than a field.

Then, the process of the signal transformation is inverse to as shown in FIG. 9. So the separated Y and C signals are outputted from the output terminals 36 and 37 respectively.

The track pattern in FIG. 8 can operate in any long play mode to provide a track pattern similar to that shown in FIG. 8. Furthermore, the changeover period of Y and C signals in the first and second memories may be changed to $m \times H$ (m is any integer larger than one).

In the track pattern of FIG. 7 and FIG. 8, the rates of the luminance and chrominance signals in each of combined signals are equal to each other. Now, we show still another embodiment of the present invention for realizing a track pattern shown in FIG. 10. This embodiment is also essentially different from the embodiment of FIG. 1 in the R/W address and timing control of the memories as described before.

Figure 10:
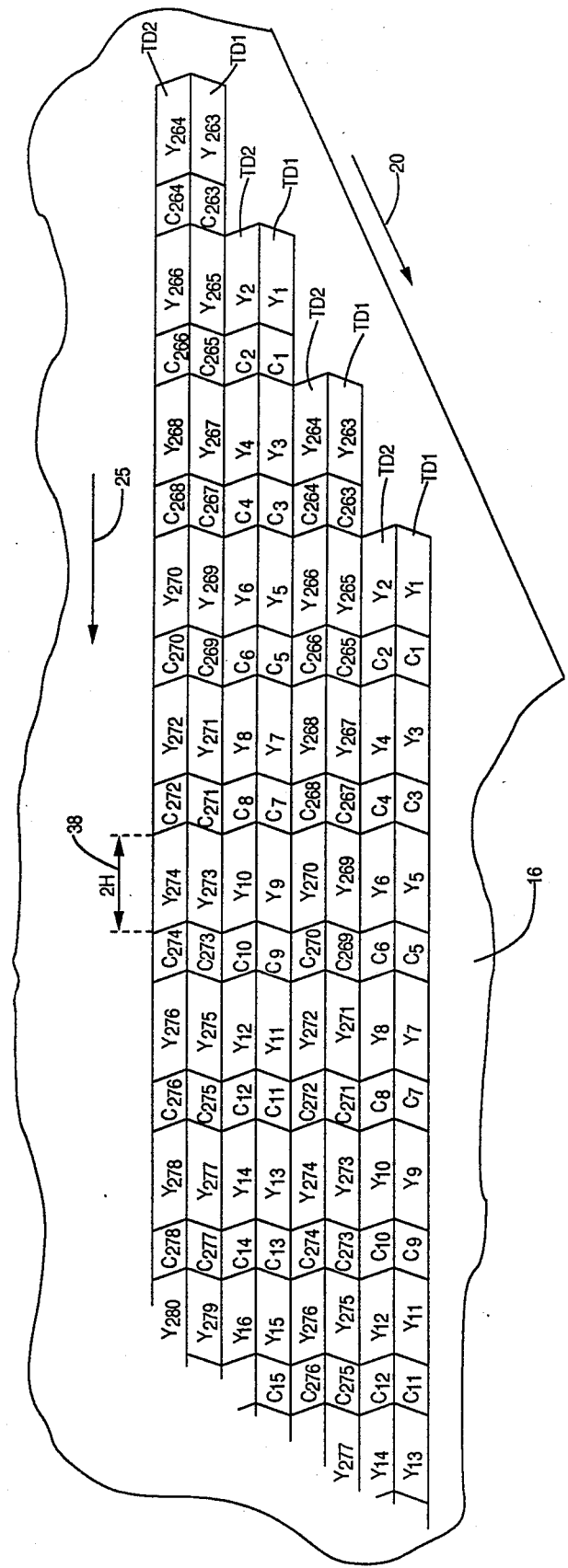
FIG. 10 is a track pattern diagram showing still another example of signal track pattern in a standard mode according to the present invention.
Figure 11:
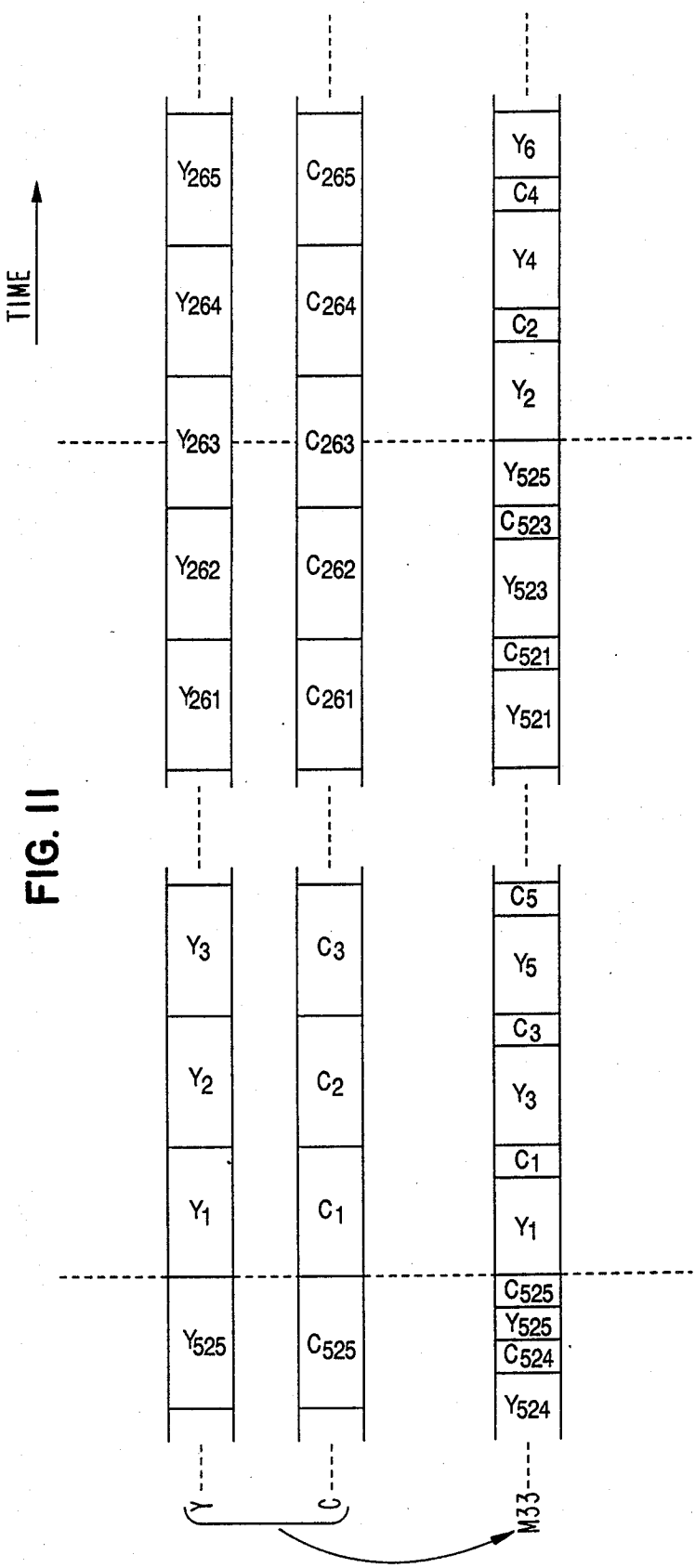
FIG. 11 is a signal timing chart showing signal transformation processing to obtain the track pattern of FIG. 10.

Referring to FIG. 11, the input signal Y is compressed to $(1+A)/2$ times when outputted from the first memory and the input signal C is compressed to $(1-A)/2$ times when outputted from the second memory (here, A has a predetermined value which is determined in accordance with the frequency bands of the input luminance and chrominance signals and the frequency characteristics of the electromagnetic conversion system. So, in FIG. 10, the total succession period of Yi and Ci (i: integer) in the time domain become H, but the recording unit is a 2H of baseband signal. The tracks TD1 and TD2 are respectively recorded by the head D1 and D2.

In the track pattern shown in FIG. 10, since the same kind of signal (in this case the signal of an adjacent track has more correlation than in the case of FIG. 6) is recorded on the parts adjacent to each other in the head width direction, the influence of crosstalk is also at a minimum as described before.

Therefore, the signals recorded on each track will hardly be affected by the crosstalk from the signals recorded on an adjacent track. In this case, still more, since the recording wavelength of the luminance signal Y becomes longer, the baseband bandwidth of the input luminance signal Y can be selected wider than the above described two cases, so the quality of a luminance signal Y can become better. Because it is often said in general that a luminance signal requires more bandwidth than a chrominance signal C, there exists the best mixture ratio of a wider band luminance signal Y and a narrower band chrominance signal C.

The track pattern shown in FIG. 10 can be also realized in any long play mode since the track pattern in any mode become similar.

Furthermore, the changeover period of the luminance signal Y and the chrominance signal C in the first memory and the second memory may be changed to $m \times (1+A) \times H/2$ and $m \times (1-A) \times H/2$ respectively (m: any integer larger than one).

Figure 12:
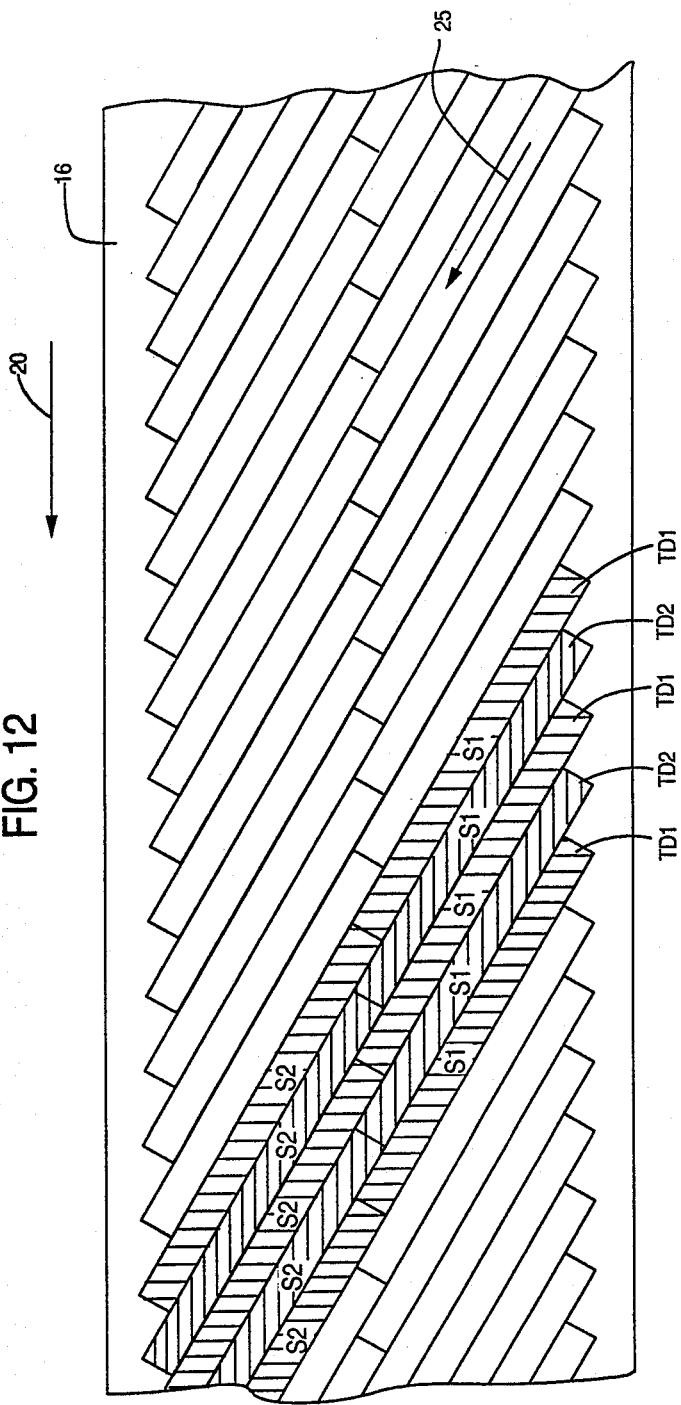
FIG. 12 is a track pattern diagram showing a further example of signal track pattern in a standard mode according to the present invention.

FIG. 12 shows a further track pattern example of the present invention. This embodiment is also essentially different from the embodiment of FIG. 7 only in the read/write address and timing control of the four memories.

Figure 13:
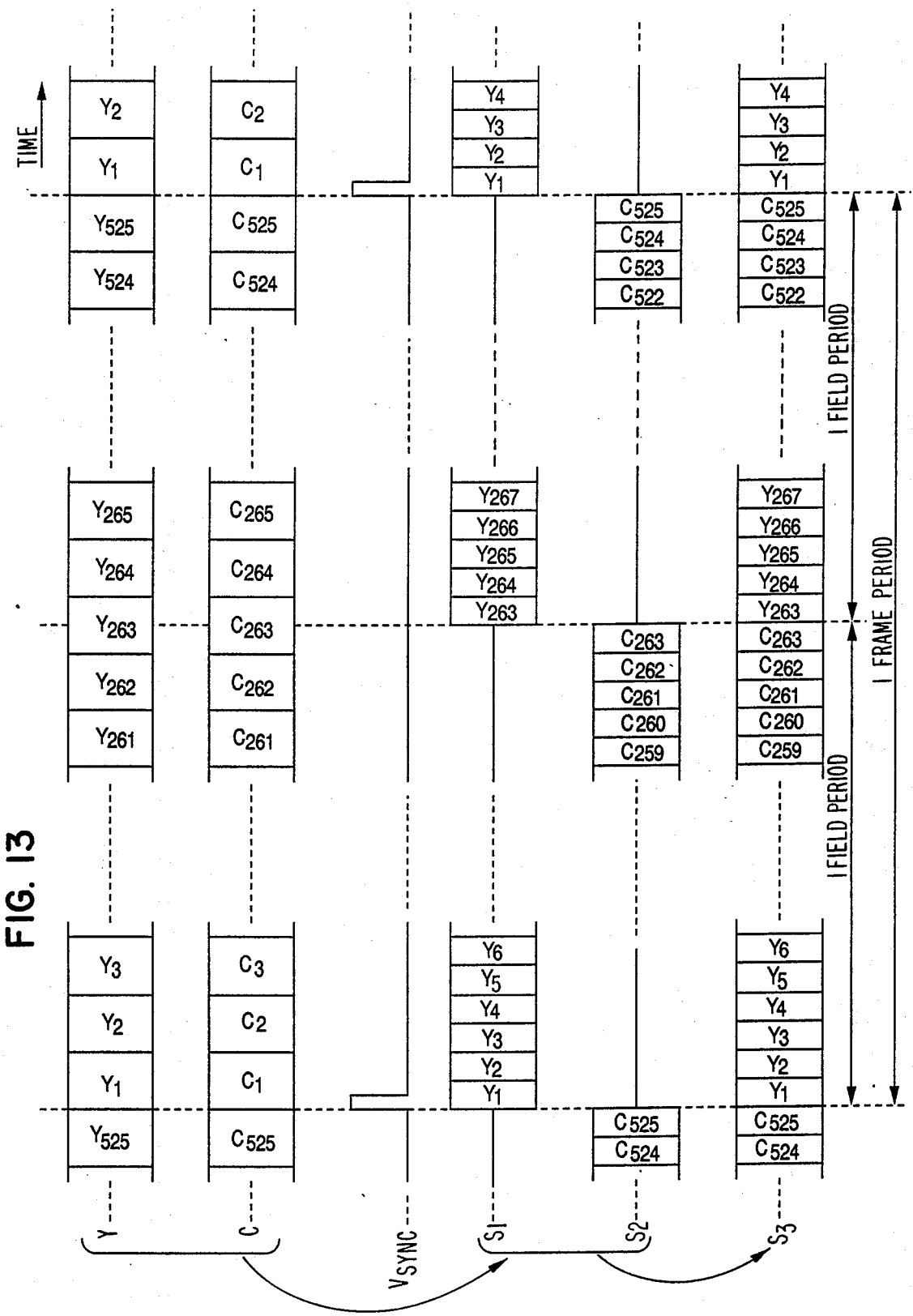
FIG. 13 is a signal timing chart showing signal transformation processing to obtain the track pattern of FIG. 12.

Referring to FIG. 13, a field succession of the input signal Y is one half times time-compressed when read out from the first memory, and a field succession of the input signal C is also one half times time-compressed when read out from the second memory. As the total succession period of S1 and S2 is a field, the baseband signal frequency of S1 and S2 is twice as high as the input YT and C signal.

In FIG. 12 the tracks TD1 and TD2 are recorded by the heads D1 and D2 respectively. Since the same kind of signal is recorded on the parts adjacent to each other in the head width direction, the influence of crosstalk is also at a minimum as described before. Therefore, the signal recorded on each track will hardly be affected by the crosstalk from the signal recorded on an adjacent track.

The track pattern shown in FIG. 12 can be also realized in any long play mode since the track pattern in any mode become similar. Furthermore, by inserting a non-recording area in the joint part of S1 and S2, we can get the track pattern in which all of the adjacent tracks of a luminance signal are that of another luminance signal or no signal, i.e., a guard band, and all of the adjacent tracks of a chrominance signal are that of another chrominance signal or no signal.

Figure 14:
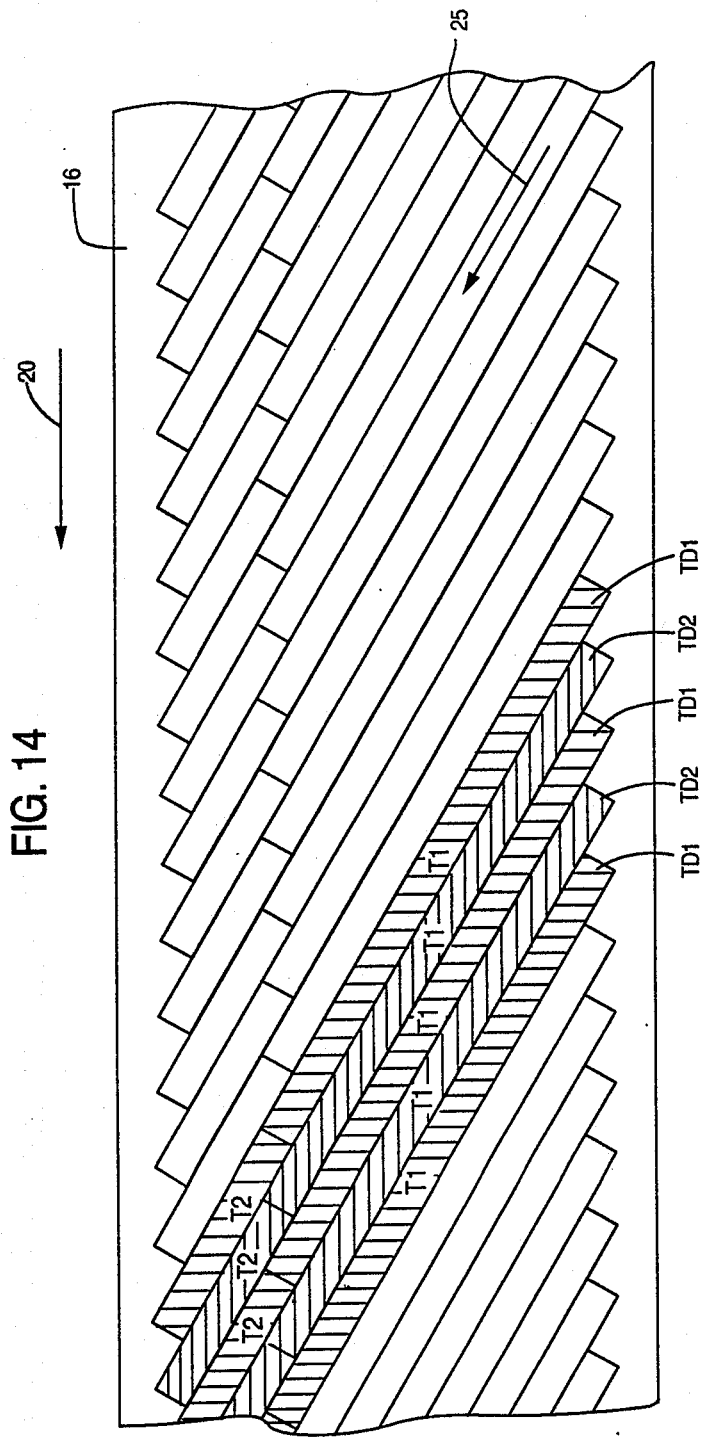
FIG. 14 is a track pattern diagram showing a still further example of signal track pattern in a standard mode according to the present invention.

FIG. 14 shows a still further track pattern example of the present invention. This embodiment is also essentially different from the embodiment of FIG. 7 only in the R/W address and timing control of the four memories.

Figure 15:
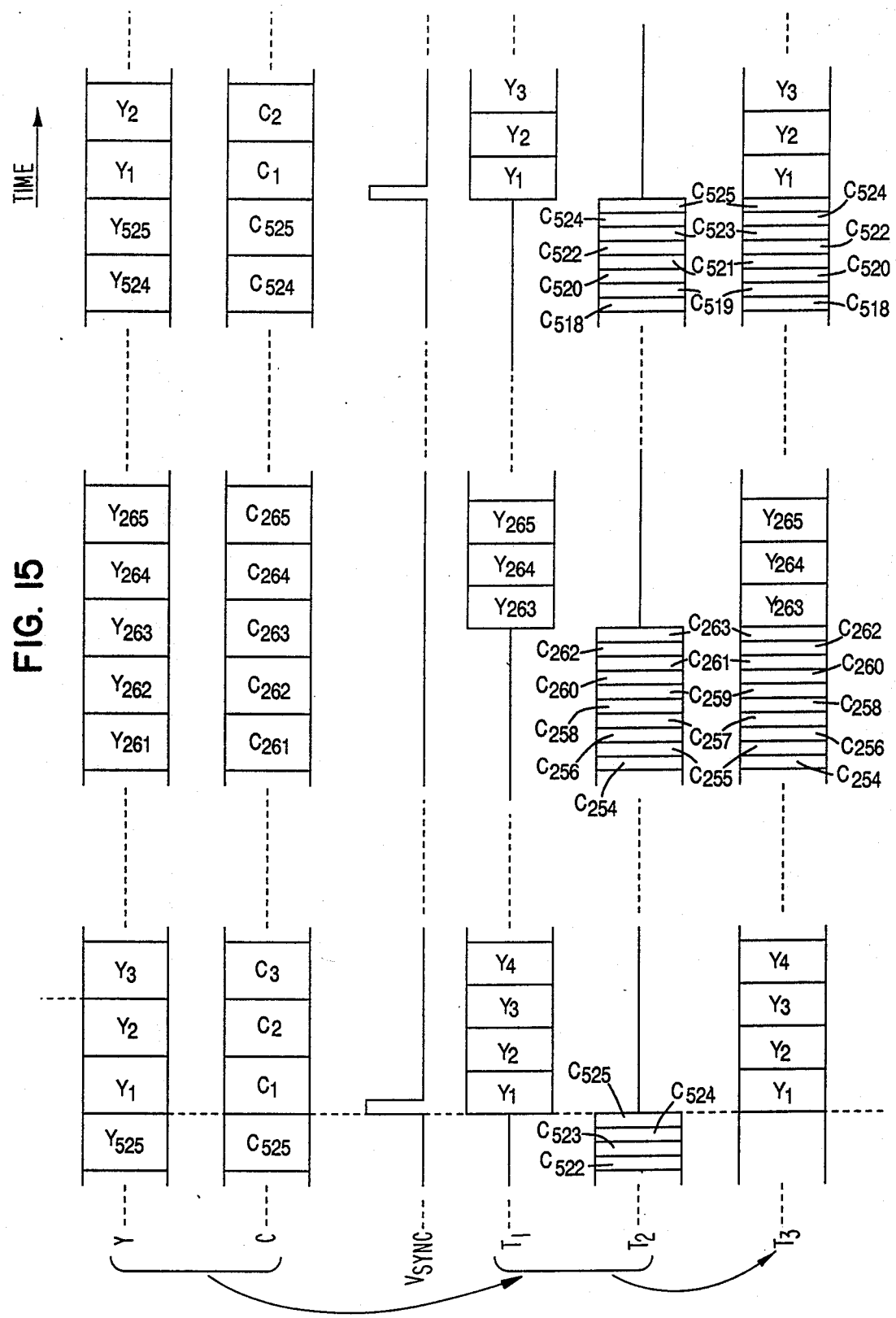
FIG. 15 is a signal timing chart showing signal transformation processing to obtain the track pattern of FIG. 14.

Referring to FIG. 15, a field succession (F) of the input signal Y is compressed to $(1+A) \times F/2$ so as to form the T1 signal in FIG. 15 (here F is a field span), when read out from the first memory, and a field succession (F) of the input signal C is compressed to $(1-A) \times F/2$ so as to form the T2 signal in FIG. 15 when read out from the second memory.

Since the total succession period T1 and T2 is a field, the baseband frequency of T1 is $2/(1+A)$ times higher than the input signal Y, and the baseband frequency of T2 is $2/(1-A)$ times higher than the input signal C. The record wavelength of the Y signal become longer, so the baseband bandwidth of the input Y signal can be selected so as to be wider than the case of FIG. 12. Thus, the quality of the luminance signal Y become better as described before.

In FIG. 14, the tracks TD1 and TD2 are recorded by the heads D1 and D2 respectively. Since the same kind of signal is recorded on the parts adjacent to each other in the head width direction, the influence of crosstalk is also at a minimum as described before. Therefore, the signals recorded on each track will hardly be affected by the crosstalk from the signals recorded on an adjacent track.

The track pattern shown in FIG. 14 can be also realized in any long play mode since the track pattern in any mode become similar. Furthermore, by inserting a non-recording area in the joint part of T1 and T2, we can get the track pattern in which all of the adjacent tracks of the luminance signal are that of a luminance signal or no signal and all of the adjacent tracks of the chrominance signal are that of a chrominance signal or no signal.

In the above description, the luminance and chrominance signals are used as the two channel component signals. But, the present invention can be applied to other video signals, for example, to the MAC signals developed in Europe.

Furthermore, in the above description the signals are used as the two channel component signals. But, the present invention can be applied to any signal which has more than two channel signals.

In the above description, the luminance and the chrominance signal are, for example, one half times time-compressed and the rotary cylinder rotates one turn during a field. Then, the recorded signals can be reproduced by other well-known types of video tape recorders which have four heads and rotate one half turn during a field.

In the above description, a RAM is used for the memories, but other types of memories e.g.-a charge-coupled device (CCD), can be used.

Furthermore, it is easy to realize various track patterns which are different from above described track patterns by only changing the address and timing control of memories, so it is also easy to reproduce video signals recorded by conventional vide tape recorders. In the playback mode, special video signal processing such as noise reduction, can be easily introduced by conventional use of memories.

What is claimed is:

1. A video tape recorder for recording two-channel component signals of a video signal on a magnetic tape and reproducing the recorded signals, comprising:

first and second memory means for time-compressing said two-channel component signals by $(1+A)/2$ and $(1-A)/2$, respectively, where A is a predetermined value, and alternately outputting the time-compressed two-channel component signals to obtain a time compressed one channel signal in which the time-compressed two-channel component signals occur alternately;

a frequency modulating means for frequency-modulating said time-compressed one-channel signal to obtain a frequency-modulated signal in which frequency-modulated time-compressed two-channel component signals occur alternately;

an electromagnetic conversion means including a pair of rotary magnetic heads for recording said frequency-modulated signal on said magnetic tape and for reproducing the recorded frequency-modulated signal from said magnetic tape, said pair of heads being disposed to be apart by 180 degrees from each other on a circumference of a rotary cylinder which rotates at a rate of one revolution per field of said video signal, the relative heights of said pair of heads in an axial direction of said rotary cylinder being the same, and the widths of said pair of heads being the same;

a frequency demodulating means for frequency-demodulating the reproduced frequency-modulated signal to obtain said time-compressed one-channel signal, third and fourth memory means respectively alternately receiving the time-compressed two-channel component signals in the time-compressed one-channel signal from said frequency demodulating means for time-expanding the received time-compressed two-channel component signals, respectively, to obtain two-channel component signals; and a memory control means for controlling address access and read/write timing of each of said first through fourth memory means such that each of said frequency-modulated time-compressed two-channel component signal is recorded to be aligned in a direction perpendicular to a scanning direction of said pair of heads on said magnetic tape, wherein said memory control means produces a first write clock and a first read clock for each of said first and second memory means, a frequency of said first read clock being twice that of said first write clock, and a second write clock and a second read clock for each of said third and fourth memory means, frequencies of said second write and read clocks being the same as those of said first read and write clock, respectively.

2. A video tape recorder for recording two-channel component signals of a video signal on a magnetic tape and reproducing the recorded signals, comprising:

first and second memory means for time-compressing said two-channel component signals by $(1+A)/2$ and $(1-A)/2$, respectively, where A is a predetermined value, and alternately outputting the time-compressed two-channel component signals to obtain a time-compressed one channel signal in which the time-compressed two-channel component signals occur alternately;

a frequency modulating means for frequency-modulating said time-compressed one-channel signal to obtain a frequency-modulated signal;

an electromagnetic conversion means including a pair of rotary magnetic heads for recording said frequency-modulated signal on said magnetic tape and for reproducing the recorded frequency-modulated signal from said magnetic tape, said pair of heads being disposed to be apart by 180 degrees from each other on a circumference of a rotary cylinder which rotates at a rate of one revolution per field of said video signal;

a frequency demodulating means for frequency-demodulating the reproduced frequency-modulated signal to obtain said time-compressed one-channel signal, third and fourth memory means respectively alternately receiving the time-compressed two-channel component signals in the time-compressed one-channel signal from said frequency demodulating means for time-expanding the received time-compressed two-channel component signals, respectively, to obtain two-channel component signals and a memory control means for controlling address access and read/write timing of each of said first through fourth memory means, said memory control means having a means for producing a first write clock signal and a first read clock signal for each of said first and second memory means, the frequency of said first read clock signal being twice that of said first write clock signal, and a second write clock signal and a second read clock signal for each of said third and fourth memory means, frequencies of said second write and read clocks signals being the same as those of said first read and write clocks signals, respectively.

* * * * *